Figure 4:
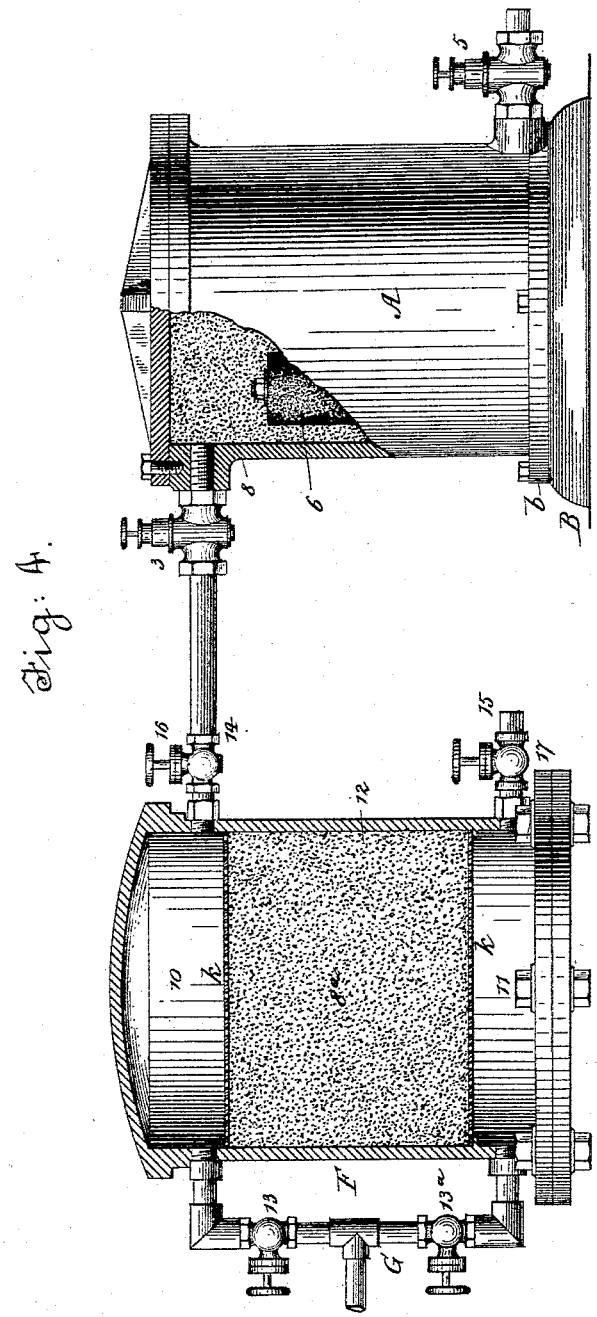

(No Model.) 3 Sheets—Sheet 1.
F. W. BROWNLOW.
FILTER.
No. 388,017. Patented Aug. 21, 1888.
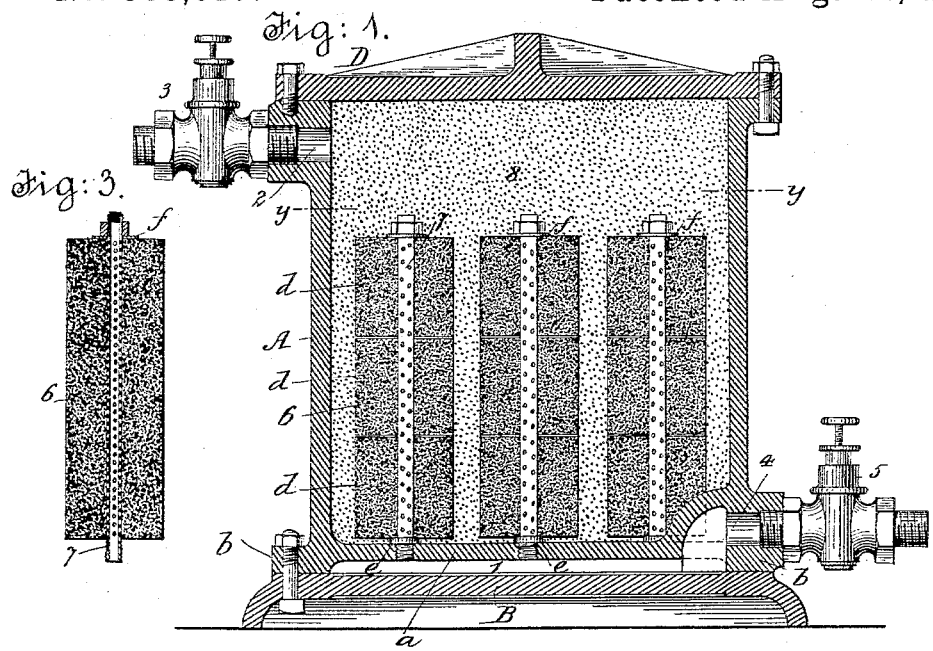
Fig. 1.
Fig. 3.
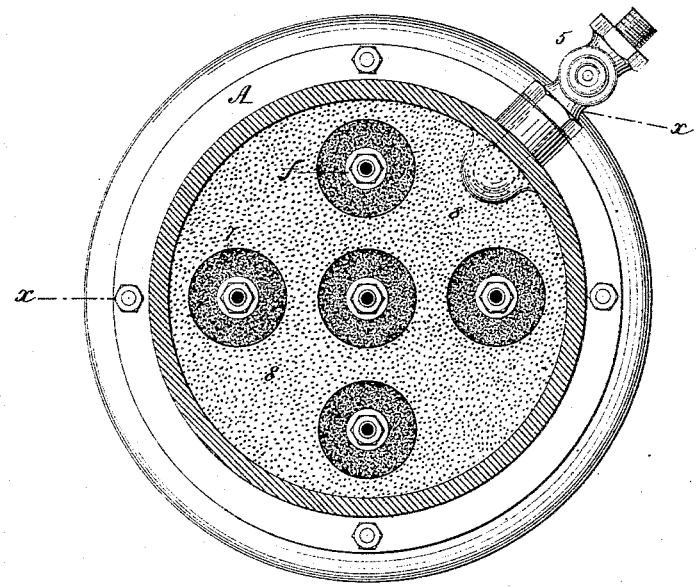
Fig. 2.
Witnesses:
John A. Rennie.
Harry Holden.
Inventor,
Fredk. W. Brownlow.
Per: Witton C. Down
his Atty.

(No Model.) 3 Sheets—Sheet 2.

F. W. BROWNLOW.
FILTER.

No. 388,017. Patented Aug. 21, 1888.

Witnesses:
John A. Rennie
Harry Holden

Inventor,
Fred'k W. Brownlow
Per: Witton C. Down
his Att'y (No Model.) 3 Sheets—Sheet 3.
F. W. BROWNLOW.
FILTER.
No. 388,017. Patented Aug. 21, 1888.
Fig: 5.
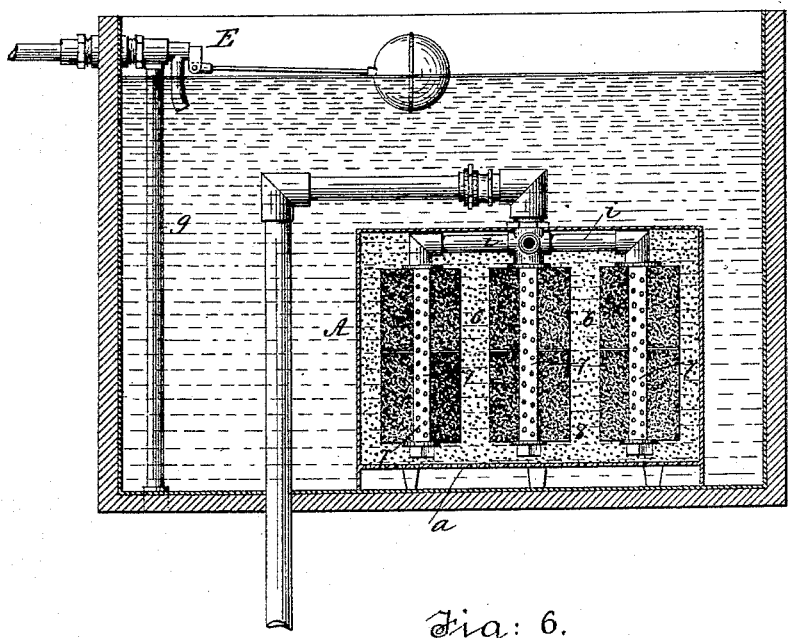
Fig: 6.
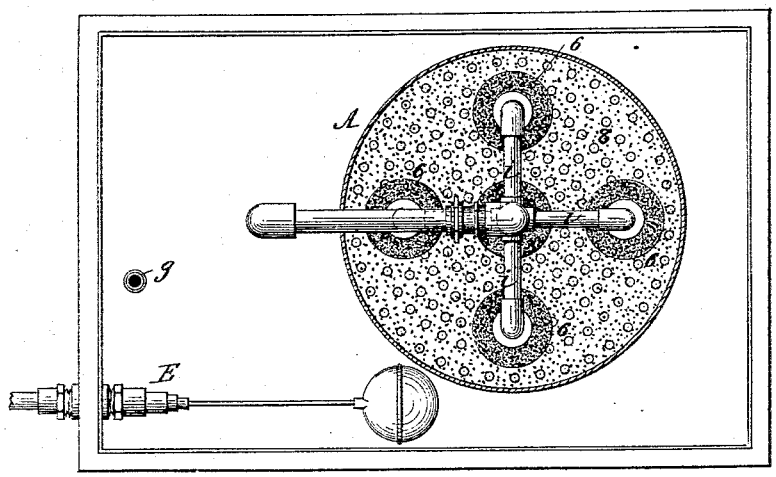
Witnesses:
John A. Pennie.
Harry Holden.
Inventor,
Fredk. W. Brownlow.
Per:
his Atty.

UNITED STATES PATENT OFFICE.

FREDERICK W. BROWNLOW, OF MANCHESTER, COUNTY OF LANCASTER, ENGLAND.

FILTER.

SPECIFICATION forming part of Letters Patent No. 388,017, dated August 21, 1888.

Application filed March 21, 1887. Serial No. 231,699. (No model.)

*To all whom it may concern:*

Be it known that I, FREDERICK W. BROWNLOW, of Manchester, in the county of Lancaster, England, have invented a new and useful Filter, of which the following is a specification.

This invention has reference to filtering and purifying water by passing it through a filtering medium composed of compressed carbon, such as is described in my application for Letters Patent for "Filter" bearing even date herewith.

My present improvements constitute a further development of the principle of the said invention and its application in the construction of filters for supplying a large and constant flow of pure water—for example, to institutions, manufactories, &c., or wherever pure water in large quantities is required.

The objects of my present improvements are, first, to construct filters in such a manner that within practical limits the filtering medium may be extended or multiplied without lessening the rapidity of the flow of filtered water; second, to provide a filter especially useful for high pressures; third, to increase the capacity of the filter without enlarging the mass or body of the principal filtering medium, and, fourth, to construct the filter so that the cleaning, removal, and renewing of the filtering media in the largest apparatus are accomplished with nearly as much ease and celerity as in the smaller apparatus.

Referring to the drawings, Figure 1 represents a vertical section of my improved high-pressure filter, the section being taken on line $x\ x$ of Fig. 2; Fig. 2, a horizontal section of the same, taken on line $y\ y$ of Fig. 1; Fig. 3, a longitudinal sectional view of the compressed carbon filtering-cylinder with its attachments. Fig. 4 represents the improved filter, and in connection therewith a primary filter. Fig. 5 represents in sectional side elevation my improved filter applied to a cistern or reservoir; Fig. 6, a plan of the same.

Referring to the drawings, Sheet 1, the filter consists of a case, A, made of iron, steel, or other suitable material, and preferably of circular shape. The size may be adjusted to the quantity of filtered water the apparatus is required to supply. The bottom $a$ of the case, Figs. 1 and 4, has a downwardly-projecting flange, $b$, which rests upon a base, B, to which it is securely bolted. In the joint between the flange and the base a suitable packing is placed to insure a water-tight joint. Between the bottom $a$ and the base B, within the flange $b$, a chamber, 1, is thus formed, into which the filtered water passes from the filtering medium. The case is closed by a cover, D, which is securely bolted to the case and the joint between packed water-tight.

At the top of the case, on one side, is a port, 2, provided with a tap, 3, and which connects with the main service-pipe directly or by a branch. On the opposite side of the case, at the bottom, is another port, 4, provided with a tap, 5. This port leads from the chamber 1, and in order to give space to form the said port the bottom $a$ is formed with an arch, thus enlarging the chamber around the inner end of the port. This port 4 is the exit for the filtered water, as port 2 is the entrance for the unfiltered water.

Within the case $a$ is placed the filtering media, which, by preference, consists of compressed-carbon cylinders, forming the main filter, and a surrounding compact body of granulated carbon, constituting the primary filter. The compressed-carbon cylinders 6 are each composed of one or more sections, $d$, placed over a central hollow perforated tube, 7, which is screwed into the bottom $a$, a tapped hole being made in the bottom for the end of the tube. A rubber washer, $e$, is placed over the tube, between the base-section $d$ of the cylinder and the bottom, for the purpose of forming a water-tight joint at this point, and thereby prevent water leaking through the bottom or passing up in the hole in the cylinders and entering the tube without passing through the compressed-carbon cylinders. The sections of the cylinder are cemented together at the joints, and otherwise securely held together and on the tubes $a$ by nuts on the end of the tube where it projects out of the cylinder, as shown. Between the nuts and the top of the cylinder, around the tube, a washer, $f$, is placed, to pack the joint. The upper end of the tube is closed or stopped, so that the water cannot flow from the filter-case directly into the tube. Any number of these cylinders with perforated tubes is employed in this kind of filter. Five are shown; but they may be increased to correspond to the diameter of the case. In the case shown seven cylinders can be conveniently and usefully placed. Furthermore, the cylinders can be composed of a greater number of sections, if desired.

The advantages of forming the main filtering medium of a number of separate cylinders instead of a solid mass lie in the greater rapidity with which the water is filtered, the ease with which the cylinders are cleaned, and when worn out removed, and, further, the readiness with which they may be replaced by new cylinders.

The surrounding body, 8, of granulated carbon eliminates from the water all the grosser impurities which it may contain, and thereby, when it reaches the compressed carbon, it is so far deprived of them that the pores of the cylinders are not liable to become stopped, and the compressed carbon is left to take up and eliminate the more subtle impurities.

Figs. 5 and 6 illustrate the invention applied to a cistern or reservoir. The cistern or reservoir is constructed in any suitable manner and provided with the usual supply-pipe connected with or leading to any source of supply, an automatic cut-off valve, E, and an overflow-pipe, $g$, all these devices being of well-known or suitable construction. Inside the cistern is placed an iron tank, A, preferably of circular form and closed at the top and sides, but having a perforated bottom. The sectional compressed-carbon cylinders 6 and perforated tubes 7, inserted in the same, are placed in the tank and suspended therein by connecting the upper end of the tubes 7 with branch pipe $i$, which unite with a main pipe that is carried through the top of the tank, (a suitable packing being used to make the joint water-tight,) and thence by suitable connections down through the bottom of the cistern or outside of the same to the point where the water is delivered. The pipe thus described forms a siphon, which carries off the filtered water from the filtering-cylinders. The space within the tank and around the cylinders is preferably filled with pulverized or granulated carbon or charcoal, 8, as in Figs. 1 and 2.

The operation of this filter may be readily understood. The unfiltered water passes up through the perforated bottom of the tank, and thence permeates and flows through the body of granulated carbon. Thence it passes to and is filtered through the carbon cylinders into the perforated tubes, whence it is automatically drawn off by the siphon-pipe.

Fig. 4 represents the improved high-pressure filter provided with a primary filter. This primary filter consists of a case, F, of suitable size, shape, and material, preferably iron, and has its interior divided by perforated plates $k\ k$ into upper and lower water-chambers, 10 11, and an intermediate filtering-chamber, 12, which is filled with granulated carbon compacted together. The water-chambers are connected outside the tank by a pipe, G, which connects with the main service-pipe and has valves 13 13$^a$, the former between the main service-pipe connection and the upper water-chamber and the other between the said connection and the lower water-chamber. The two water-chambers are provided, respectively, with exit-pipes 14 15, the former of which connects with the supply-pipe of the filter and the latter with the waste-pipe or whatever may be used to carry off the waste water. The middle chamber is filled with granulated carbon, 8$^a$, forming thus the primary filtering medium. It is designed in this case that the water shall pass through the primary filter before entering the main filter. For this purpose the valve 13 is closed and valve 13$^a$ opened. This allows the water to enter chamber 11, pass upward through the filtering material 8$^a$ in chamber 12 to chamber 10, and thence through the connecting-pipe to the main filter. The primary filter deprives the water of all the grosser impurities and prevents their entrance to the main filter. This is a great advantage, as the former has means for cleaning it without removing the filtering material. This means of cleaning consists in the provision for turning the water downward through the filter and reversing the direction of its flow without letting it pass to the main filter. This is accomplished by closing valves 13$^a$ and 16 and opening the valves 13 and 17. The water now passes to the upper chamber, 10, thence downward and through the filtering medium to chamber 11, and out through the valve 17, thus flushing the filter and carrying away the substances intercepted by the carbon in the upward passage of the water through it.

The tubes 7, it must be understood, and all connections thereof that the water comes in contact with are preferably made of block-tin or other metal which will not contaminate the water.

I claim—

1. As a new article of manufacture, a filtering medium consisting of a cylinder of solid homogeneous compressed carbon, provided with a central longitudinal tubular opening extending entirely through the same, and having a perforated tube of non-corrosive metal fitted tightly in said tubular opening, its ends projecting therefrom, one of said ends being closed, a suitable packing placed over the end of the tubular opening from which the closed end projects and around said end, and a nut fitted to the projecting end and screwed down against the packing, the opposite end of said tube being open and arranged to make connection with a filter, substantially as specified.

2. A filtering medium consisting in the combination of a compressed homogeneous carbon cylinder composed of two or more sections, each section having a central longitudinal tubular opening, and a perforated non-corrosive metal tube passed through said tubular openings and uniting the said sections together, said tube fitting tightly in said opening and having its ends projecting from the cylinder, one of said ends being closed and fitted with a nut and the other end being open and arranged to be connected with a filter, substantially as specified.

3. The combination of the filter-case A, provided with a suitable entrance-port, a filtering medium placed in said case and connected with the bottom thereof, said filtering medium consisting of a homogeneous compressed-carbon cylinder provided with a central longitudinal tubular opening, and a perforated non-corrosive metallic tube connected at one end with the bottom of the case and passed through the cylinder of compressed carbon, its upper end being closed and fitted with a nut by which the cylinder and tube are fastened together, substantially as specified.

4. A multiplex filter consisting of the combination of the filter-case A, provided with a suitable entrance-port, filtering media placed in said case, said media consisting of separate cylinders of homogeneous compressed carbon having central longitudinal tubular openings and perforated non-corrosive metallic tubes, each of which has one end passed through the bottom of the case, and each of said tubes being passed through a carbon cylinder, its end projecting therefrom being closed and fitted with a nut, by which the cylinder is connected with the tube, substantially as specified.

5. The combination, in a filter, of a case, A, provided with a suitable entrance-port, a filtering medium consisting of one or more cylinders of homogeneous compressed carbon, a perforated tube of non-corrosive metal having one end passed through the bottom of the case, said tube being also passed through a suitable tubular opening in the cylinder, and one of its ends projected out of the cylinder and closed and fitted with a nut, and a body of granulated carbon placed in the case and around the filtering medium, substantially as specified.

In testimony that I claim the foregoing as my invention I have hereunto set my hand, at the city of New York, this 18th day of February, 1887.

FREDERICK W. BROWNLOW.

In presence of—
   GEO. B. GOUGH,
   J. A. RENNIE.